UNITED STATES PATENT OFFICE.

JAMES L. KRAFT, OF CHICAGO, ILLINOIS.

PROCESS FOR TREATING CHEESE.

1,323,869.  Specification of Letters Patent.  Patented Dec. 2, 1919.

No Drawing.  Application filed March 14, 1919. Serial No. 282,645.

*To all whom it may concern:*

Be it known that I, JAMES L. KRAFT, a citizen of the United States, residing in the county of Cook, at Chicago, Illinois, have invented a certain new and Improved Process for Treating Cheese, of which the following is a specification.

This invention relates to an improved process for treating cheese, and refers more specifically to a process for remaking cheese consisting wholly or chiefly of the Cheddar genus. By the term "Cheddar genus" I mean to include all cheeses, however named, made by a Cheddar process.
The chief objects of the invention are; to provide a process whereby cheese in weights which for any reason are not readily salable may be remade into salable cheese in such may be remade into salable cheese in such weights as are at the time in great demand;
to provide a process by which cheese of sizes which are convenient and suitable for economical making, curing and storing, but not readily marketable, may be rapidly, economically and efficiently remade into cheese of sizes which will be most readily salable; to provide a process whereby lack of uniformity in composition, flavor, moisture, conditions of age, etc., is eliminated and a blended product produced which may readily be made to conform to the desired standards, etc.; and to provide a process for converting ordinary commercial cheese into cheese specially adapted to withstand comparatively high temperatures for extended periods without becoming spoiled.

The invention does not apply to the socalled soft cream cheese varieties, *i. e.*, uncured cheeses of the cottage or cream cheese type.

It is at present the common practice to put up cheeses of the Cheddar genus in the form of whole milk cheese, full cream cheese, special or partly skimmed cheese, skimmed cheese and other varieties as regards the important butter-fat and casein constituents; it is common practice to market Cheddar cheeses in a great variety of sizes, shapes, qualities, degrees of curing, etc., and it is well known that cheeses of the same designated variety coming from different factories, or coming from the same factory under different conditions, vary considerably and sometimes vary to a seriously detrimental extent. This state of the art leads to great confusion and often leads to great injustice in the matter of fixing the proper price for the product, and in the matter of the purchaser knowing just what he is buying.

The desirability of uniforming and more or less standardizing cheese is obvious, but heretofore these conditions have not been attainable because it has not been known how such cheeses could be blended and made uniform without either destroying or greatly impairing the quality of the blended product.

My process is also of great value in correlating the considerations, conditions or requirements respectively involved in the manufacturing of cheese and the marketing of the same. In manufacturing cheese the greatest economy is secured when the product is put up in comparatively large sizes, for instance weights of from sixty to one hundred pounds are usually considered desirable from a manufacturing standpoint. It is found, also, that cheese in the larger sizes cures to better advantage and is better adapted for storage than cheese put up in smaller units of say from ten to thirty pounds in weight. On the other hand, when marketing the cheese the larger sizes meet with very much less favor in the trade than the smaller cakes, the most popular sizes from a selling standpoint being five to twenty pound cakes. By reason of the supply of such small sizes being less than the demand, due to difficulty and expense in manufacture, a considerably higher price per pound may be secured for the smaller sized product.

Another problem in merchandising cheese is due to the fact that the curing of cheese usually requires from one to four months time, and therefore it cannot be made up on short notice in the desired sizes to correct possible shortages in such sizes due to heavy buying of a particular size though at the same time the market may be overstocked with cheese of other weights.

Hence, the desirability of being able to convert cheese of sizes not in demand into sizes of which there is a temporary shortage will be apparent.

I have discovered a process whereby the desired objects may be accomplished in a thoroughly practical and desirable way, at an extremely low cost, and in a very simple manner.

My improved process is adapted to produce a cheese of any desired size and of any desired standardized richness. As illustrating the versatility of my process, it may be mentioned that I can produce from cheese readily obtainable on the market ordinarily cheeses of the styles or types that have heretofore been largely imported from Holland, namely Edam cheese, Gouda cheese, and similar types. By my process such special types of cheese can be prepared and made ready for the market in the matter of a few days, whereas it is well known that the methods heretofore practised in putting up such special types, require from one to four months time to prepare the cheeses.

In practising my improved treatment or process, a number of Cheddar cheeses of different batches which may vary as to style, size, shape and richness, are first denuded of their bandages or outer coverings, then cut into strips or pieces, and comminuted in any suitable or ordinary machine or device for so doing. An ordinary Enterprise grinder is a suitable machine for this purpose. The cheeses so chosen and ground up or otherwise comminuted are, of course, so selected as to produce the blended and uniformed product desired. Suitable portions, or the whole, of the selected and comminuted cheeses are placed in a mixing and blending vessel, which should have double walls, and the inner vessel must be provided with a suitable stirring device, consisting, preferably, of a set of rotatable power-driven paddles and coöperating set of stationary paddles or breakers. The inner vessel should be equipped with a cover to serve the purpose of retaining the heat within the vessel and, as well also, to minimize the evaporation of the moisture contained in the cheese.

A suitable charge of the ground cheese having been placed in the mixing vessel, heat is applied to the latter in such manner and amount as to raise the temperature of the cheese gradually to what I term a "critical" temperature and condition, hereafter described. Meantime, while the heat is being applied, the mass of cheese is vigorously agitated or stirred, such stirring being desirably continued throughout the entire process of heat treatment and necessarily continued during the latter stages of the treatment.

As the temperature of the mass of cheese rises and approaches the critical condition, the cheese becomes of a taffy-like consistency which is, perhaps, better described as being between the consistency of dough and rubber. The temperature of the cheese, when it has reached the desired consistency, will vary somewhat with different batches and varieties of cheese, and may be anywhere from 125° F. to 150° F., but the "critical condition" has arrived when the cheese may be drawn out into long attenuated strings without breaking. For a full cream cheese this temperature, according to my practice, will usually be slightly below 140° F.; somewhat higher temperature being required for a skim cheese or one containing less butter-fat.

I term this condition critical because if the temperature be raised and the treatment continued after the cheese has attained the desired consistency, it becomes short, is changed from its true cheese character, and eventually takes on a creamy consistency, which results in a breaking of the original texture of the Cheddar style of cheese. On the other hand, if the treatment with heat and agitation be less than that required to bring the cheese to the "critical condition", the product will be a failure, both because it will not be fully blended and homogeneous throughout. The discovery that there exists such a "critical condition" of the treatment and how to attain and determine that condition constitutes an important and characteristic part of my invention.

I have found that when the cheese has been brought to this critical condition as heretofore set forth, it is in the proper condition for the necessary subsequent treatment, i. e. molding and pressing, as it will then unite perfectly and thereby form a solid mass of true cheese.

As soon as the cheese has reached the proper physical condition above described, the treatment is arrested, and, in order that the cheese may be promptly withdrawn from the vessel and the action of the heat, it is desirable that the mixing vessel be provided with a comparatively large outlet in its lower part so that when this outlet is opened and experience is required in securing the best results, no great difficulty will be met in successfully practising the process as above described.

Frequently, in order to produce a cheese of the desired texture and moisture content, it may be advisable to add a considerable percentage of water during the treatment, preferably at or near the commencement of the process. Incidentally, the addition of a small percentage of water has the effect of making the process somewhat easier to practice, and greater uniformity in the product is secured.

In other cases, it may be desired to produce a cheese which will withstand the wetting and other undesirable effects of hot weather or high temperature better than ordinary commercial cheese as it leaves the factory. This is particularly true where the cheese is intended to be shipped into comparatively warm climates. In such a case I have found it possible to secure this desirable result by adding to the mass during the treatment a small percentage of an edible oil, for instance hydrogenated cocoanut oil, which has a considerably higher melting point than the melting point of butter-fat, resulting in the production of a cheese having considerably greater capacity to resist high temperature than the original cheese.

After the mass of treated cheese has been removed from the receptacle it may be subdivided into portions of the proper size, which are then placed into molds or so-called cheese hoops. These hoops are placed in a suitable press and subjected to considerable pressure until the cheese becomes thoroughly cold. It will be understood, however, that from the time the cheese goes into the molds the subsequent steps correspond to the usual ones involved in the molding of ordinary Cheddar cheese.

Under my usual practice about two days represents the time consumed in the entire process, commencing with raw or commercial cheese and finishing at the time when the cheese has been converted into its new form as a salable article. No curing is required.

The process properly carried out secures the important desired results hereinbefore set forth.

While, for purposes of illustration, only Cheddar cheese has been referred to, the application of the process to an admixture of a predominating quantity of Cheddar cheese with a minor proportion of another variety would not be regarded as a departure from the invention.

I claim as my invention:

1. The improvement in the art of re-making cheese chiefly or wholly of the Cheddar genus which consists in comminuting the original cheese, raising its temperature while actively stirring the comminuted material, arresting the application of heat when the mass becomes of a plastic, uniformly blended consistency, but still retains its cheese texture, and subsequently reforming the mass into suitable shapes of the desired size.

2. The improvement in the art of re-making cheese of the Cheddar genus which consists in comminuting the original cheese, raising its temperature while actively stirring the comminuted material, arresting the application of heat before the temperature of the cheese exceeds 140° F. to 150° F., depending upon the butter-fat content, but not until the mass becomes of a plastic, uniformly blended consistency, and subsequently reforming the mass into suitable shapes of the desired size.

3. In the art of mixing cheese of the Cheddar genus to secure uniformity of the same in its constituent parts, preparatory to putting it up for marketing, the improved process which consists in introducing into a mixing receptacle, portions of cheese from sundry batches nonuniform in character, gradually heating, and at the same time actively stirring the mass, examining and determining the condition of said mass as it approaches a critical condition, and promptly arresting said treatment at a time when the mass has attained a uniformly blended plastic, taffy-like condition.

4. In the art of mixing cheese of the Cheddar genus to secure uniformity of the same in its constituent parts, preparatory to putting it up for marketing, the improved process which consists in introducing into a mixing receptacle comminuted portions of cheese from sundry batches nonuniform in character, gradually and with approximate uniformity, raising the temperature of the mass to a point at which it becomes plastic and blended, actively stirring and mixing the mass during such heating treatment, examining and determining the condition of said mass as it approaches said point, and promptly arresting said treatment at a time when the mass has attained a uniformly blended, cohesive, plastic condition, capable of being drawn into strings while hot.

5. In the art of mixing cheese to secure uniformity of the same in its constituent parts, the improved process which consists in introducing into a mixing receptacle, quantities of cheese from sundry batches of the same variety, but non-uniform in character, gradually heating and actively stirring the mass until it has attained a temperature between 125° F. and 145° F., and when it has reached a plastic, uniformly blended condition, arresting the treatment, and subsequently reforming the treated material into cakes of the desired shape and size.

JAMES L. KRAFT.